May 21, 1946. G. J. BRABENDER 2,400,481
APPARATUS FOR TESTING WATER-VAPOR PERMEABILITY
Filed March 25, 1944
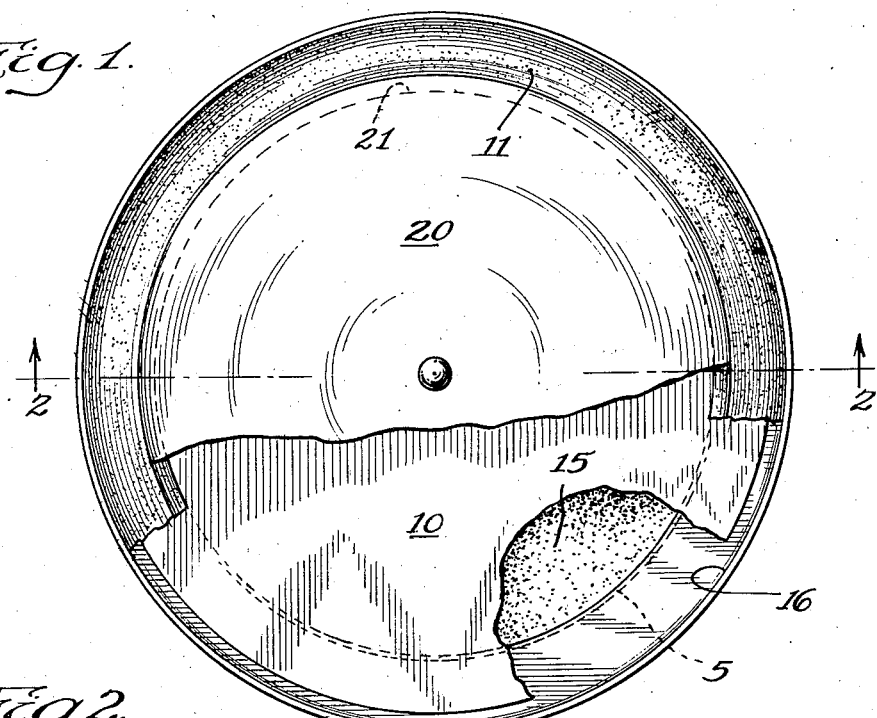
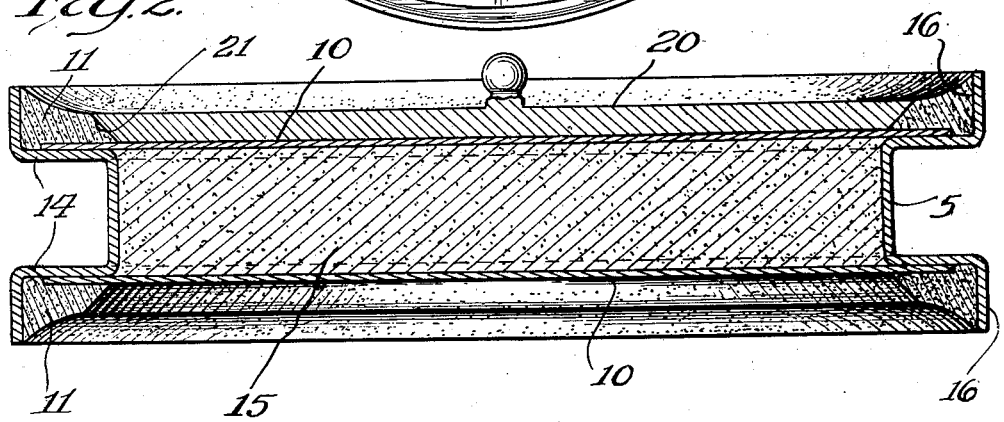
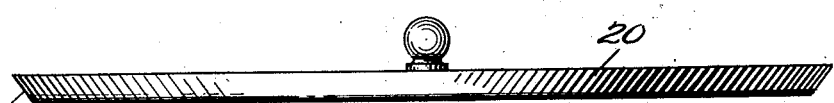
Inventor
George J. Brabender
By Joseph Rossman
Attorney Patented May 21, 1946

2,400,481

UNITED STATES PATENT OFFICE 2,400,481

APPARATUS FOR TESTING WATER-VAPOR PERMEABILITY

George J. Brabender, Wausau, Wis.

Application March 25, 1944, Serial No. 528,123

3 Claims. (Cl. 73—159)

This invention relates to an apparatus for testing sheet materials for permeability to water in its vapor state.

The usual method for determining the water vapor permeability of a sheet material such as paper consists of sealing the test sheet over the open mouth of a dish or cell and exposing the two surfaces of this sheet to atmospheres of high and low relative humidity, respectively. For example, a desiccant may be placed inside the dish, the sheet material sealed in place and the assembly exposed to an atmosphere at controlled temperature and high humidity. The assembly will gain in weight due to moisture permeation through the sheet and absorption by the desiccant. See TAPPI method T–448–m–41 and ASTM method D–697–42T. A constant rate of change in weight of the assembly gives a measure of the water vapor permeability of the sheet material.

The usual methods for measuring the water vapor permeability employ dishes or cells having a single open mouth to which the sheet is fastened. The precision of the results obtained by the usual methods is influenced by the fact that the area of the sheet being tested is limited by the size of the dish that can be accommodated on an analytical balance. Secondly, variations in atmospheric pressure during a test tend to distort the sheet. Distortion of the sheet is caused also by the changing volume of air confined in the dish due to temperature changes when the dish is removed from the testing cabinet for weighing; the cabinet frequently being at a higher temperature than the room in which the weighings are made.

Sheet materials are sometimes moistureproofed by having a moisture resistant coating applied to one face of the sheet. The water-vapor permeability of such sheets will be found to differ depending upon which face of the sheet is exposed to the atmosphere of high humidity. It is necessary to make two tests with dishes having a single opening to determine the average permeability of such a sheet for the two sides.

The precision of the weighings will depend to some extent on the gross weight of the test assembly. Therefore it is desirable to keep the ratio of gross weight to sheet area as low as possible.

The disadvantages of the previous methods are overcome by the present invention in utilizing a test cell having openings on two sides which are each adapted to receive separate test sheets as will be explained in further detail in the following specification and drawing, wherein:

Figure 1 is a plan view of a test cell made in accordance with this invention,

Figure 2 is a sectional view taken on lines 2—2 of Figure 1, and

Figure 3 is a sectional view of a circular bevelled template.

Referring to the drawing, the test cell made in accordance with one embodiment of my invention is preferably made from a metal cylindrical tube 5 of bronze, copper, steel, aluminum or other suitable metal. The tube 5 is open at each end and is enlarged at each end to provide an annular seat 14 for supporting a circular test sheet 10 cut to suitable dimension. For testing paper and similar sheet materials, I have found it advantageous for example to form a cell from a seamless aluminum tubing 0.032 in. thick, spun at both ends to have annular seat 14 inside diameters of 3 inches and 3¾ inches, for the smaller and larger diameters respectively. The annular seat is preferably positioned ¼ in. from each open end thereof.

In using the cell, a circular test sheet material 10, cut to a diameter slightly less than the diameter at the vertical wall 16, is positioned so as to be centered on annular seat 14 in one end of the cell and hermetically sealed thereto by applying molten wax or other suitable sealing material 11 around its entire annular periphery. It is advantageous to use a template 20 as shown in Figure 3 for defining the test area and effecting the wax seal, consisting of a circular metal disc ⅛ in. thick, with the edge 21 bevelled to an angle of about 45°. The diameter of the bottom (smaller) face of the template must not be greater than the diameter of the effective opening of the cell in contact with the specimen. The template is removed from the sheet surface as soon as the wax has cooled and solidified. A granular desiccant substance 15 such as anhydrous calcium chloride or anhydrous magnesium perchlorate is then placed in the cell in sufficient amount to fill the cell. A second circular sheet material 10 is then sealed in the other end of the cell and hermetically sealed thereto by molten wax 11 around its entire annular periphery in the same manner as previously described.

The assembled cell is then weighed and placed in an atmosphere of controlled temperature and humidity for a definite period of time with both test sheets fully exposed. The conditioned air is circulated so that it has free access to the exposed surface of both test sheets. At the end of such period the cell is then weighed again to determine the gain of the cell due to gain in moisture by the desiccant placed in the cell. Successive weighings of the assembly are made at suitable intervals until a constant rate of gain is attained. The weight gain against time is plotted. The slope of the resulting curve will furnish a measure of the water vapor permeability.

The use of a test cell having openings on two sides as described herein provides a means for obtaining very precise measurements of water vapor permeability. The two sheets fastened to the cell act as distensible diaphragms to compensate for change in volume of the confined air due to temperature and barometric changes. Moreover the stress due to such volume changes is distributed over two sheets, thus minimizing any distortion of the sheets due to such causes. The volume of confined air is small in comparison to the area of sheet under test so that volume changes of the air are correspondingly small and have a negligible effect on the sheet.

The amount of material used in constructing the side walls of the cell is small as compared to the size of the two openings in the cell over which the sheet is fastened. Therefore the ratio of gross weight to sheet area is small. The size and shape of the cell are such that a large number can be easily arranged in a comparatively small space in a testing cabinet by standing them upright on their rims.

A change in dimension of cellulosic and other moisture-sensitive sheet materials will occur when such sheets are exposed to high humidities. The amount of such change will depend on the relative humidity to which the sheet is exposed and the size of the sheet. Obviously, the larger the sheet the greater will be its absolute change in dimension. Such dimensional changes cause difficulty in maintaining an effective seal of the sheet to the test cell. This effect can be reduced considerably by keeping the size of the sheet small but using a greater number of test sheets to obtain a larger test area. The test cell having two openings provides for this expedient.

Details of the construction of the cell may be varied without departing from the essential features herein disclosed.

The apparatus made according to the present invention for measuring water-vapor permeability offers many advantages over the previous methods employed. The apparatus provides a small internal volume which minimizes the effect of barometric changes on weighings of the assembly. The cell permits the use of a fairly large test area, giving a more representative sample. The two test sheets in the assembly act as distensible diaphragms, also minimizing barometric effects. The size and shape of the cell are such that it can be readily accommodated on an analytical balance. The assembly is relatively light in weight, thus giving more accurate weight gain data. A large number of cells can be arranged in a comparatively small space in a test cabinet. Either or both sides of a sheet can be tested on a single cell in one set of measurements.

My apparatus is suitable for testing any kind of sheet materials, such as paper, Cellophane, cellulose acetate, vinyl resin films, ethyl cellulose films and other synthetic sheet and foil materials, fabrics, textiles, felts, parchmentized papers, leather and the like. The term "sheet material" is intended to include such sheet materials and the like.

I claim:

1. Apparatus for simultaneously testing water-vapor permeability of two test specimens of a sheet material comprising a thin light-weight tube having open ends, said tube being of size and shape for accommodation on an analytical balance and having a small ratio of gross weight to area of test specimens, each of the ends of said tube being provided with an outwardly extending flange constituting a ledge for receiving a specimen of the sheet material to be tested with a filling of desiccant therebetween, the volume of said tube being small in comparison to the total area of the test specimens to minimize barometric and temperature effects.

2. Apparatus for simultaneously testing water-vapor permeability of two test specimens of a sheet material comprising a thin light-weight metal tube having open ends, said tube being of size and shape for accommodation on an analytical balance and having a small ratio of gross weight to area of test specimens, an outwardly extending flange provided at each end of said tube constituting a ledge for receiving a specimen of sheet material to be tested of suitable contour and dimensions to close each of the open ends of said tube with a filling of desiccant therebetween, the volume of said tube being small in comparison to the total area of the test specimens to minimize barometric and temperature effects.

3. Apparatus for simultaneously testing water-vapor permeability of two test specimens of a sheet material comprising a thin light-weight aluminum cylindrical tube having open ends, said tube being of size and shape for accommodation on an analytical balance and having a small ratio of gross weight to area of test specimens, outwardly extending annular seats provided at each end of said tube for receiving a specimen of sheet material to be tested of suitable contour and dimensions to close each of the open ends of said tube with a filling of desiccant therebetween, the volume of said tube being small in comparison to the total area of the test specimens to minimize barometric and temperature effects.

GEORGE J. BRABENDER.